United States Patent
Froese

(10) Patent No.: US 7,617,857 B2
(45) Date of Patent: Nov. 17, 2009

(54) ILLUMINATED WINDOW BLIND ASSEMBLY

(76) Inventor: Brad Froese, 10225 Daybreak La. #5, Santee, CA (US) 92071

( * ) Notice: Subject to any disclaimer, the term of this patent is extended or adjusted under 35 U.S.C. 154(b) by 357 days.

(21) Appl. No.: 11/345,766

(22) Filed: Feb. 2, 2006

(65) Prior Publication Data
US 2007/0175599 A1   Aug. 2, 2007

(51) Int. Cl.
E06B 9/386 (2006.01)
(52) U.S. Cl. .......... 160/10; 160/127; 160/236; 362/192; 362/253
(58) Field of Classification Search ......... 160/236, 160/127, 10, 178.1 R, 168.1 R, 173 R; 49/92.1; 362/253, 576, 192, 559, 800
See application file for complete search history.

(56) References Cited

U.S. PATENT DOCUMENTS

| | | | | |
|---|---|---|---|---|
| 4,137,098 A | * | 1/1979 | Field | 136/248 |
| 4,279,089 A | * | 7/1981 | Murakami | 40/547 |
| 4,636,579 A | * | 1/1987 | Hanak et al. | 136/245 |
| 4,644,990 A | * | 2/1987 | Webb et al. | 160/5 |
| 5,221,363 A | * | 6/1993 | Gillard | 136/248 |
| 5,258,076 A | * | 11/1993 | Wecker | 136/245 |
| 5,412,553 A | * | 5/1995 | Wojski | 362/253 |
| 5,433,259 A | * | 7/1995 | Faludy | 160/67 |
| 5,519,595 A | * | 5/1996 | Wang | 362/234 |
| 5,554,979 A | * | 9/1996 | Kohar et al. | 340/825.72 |
| 5,760,558 A | * | 6/1998 | Popat | 318/480 |
| 5,908,179 A | * | 6/1999 | Fimbres | 248/51 |
| 6,024,476 A | * | 2/2000 | Wakeman | 362/581 |
| 6,523,968 B1 | * | 2/2003 | Walker | 362/103 |
| 6,628,885 B1 | * | 9/2003 | Wilkie et al. | 385/147 |
| 6,812,397 B2 | * | 11/2004 | Lambey | 136/245 |
| 6,877,548 B1 | * | 4/2005 | Chartier et al. | 160/178.1 V |
| 2003/0156426 A1 | * | 8/2003 | Givoletti | 362/556 |
| 2005/0189078 A1 | * | 9/2005 | Whiting | 160/176.1 P |
| 2006/0082987 A1 | * | 4/2006 | Dorsey et al. | 362/103 |
| 2008/0041533 A1 | * | 2/2008 | Ziegler | 160/10 |

FOREIGN PATENT DOCUMENTS

JP   2001082058 A  *  3/2001

* cited by examiner

Primary Examiner—David Purol
(74) Attorney, Agent, or Firm—Richard D. Clarke

(57) ABSTRACT

An illuminated blind assembly having either horizontally oriented slats or vertically oriented slats. The slats have structure that allows them to be illuminated. The slats can be A.C. or D.C. powered. The window blind assembly may have a housing containing rechargeable batteries. These batteries can be charged by photovoltaic solar cells that are positioned on the top surfaces of the slats. The window blind assembly can have a tilt/raise/lower pulley system structure and electrical servos in a housing extending across the top of the window blind assembly. An infrared remote sensor can be located in the front of the housing for controlling the electric servos and the switch for lighting up the slats.

17 Claims, 5 Drawing Sheets

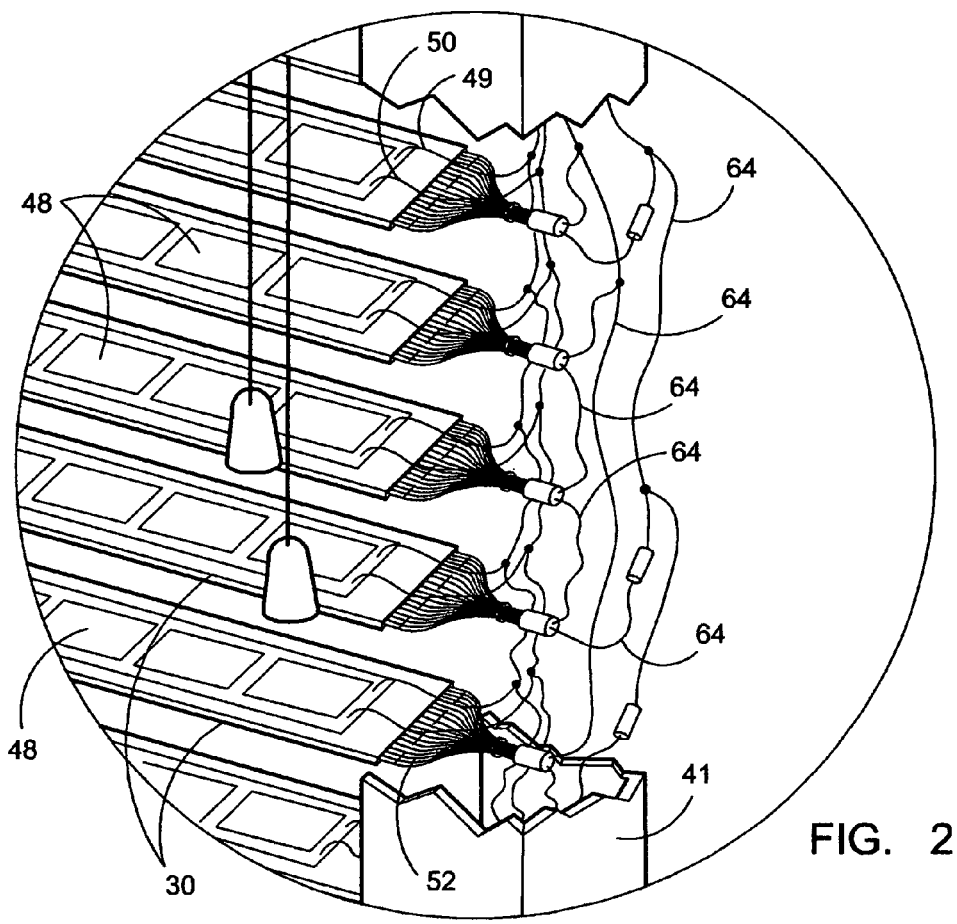
FIG. 2
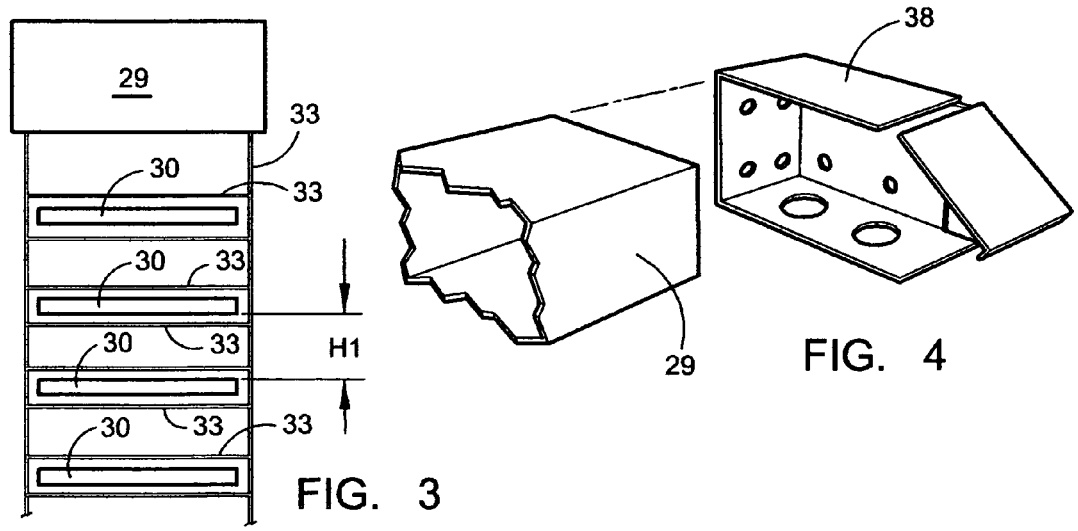
FIG. 3
FIG. 4

ILLUMINATED WINDOW BLIND ASSEMBLY

BACKGROUND OF THE INVENTION

The invention relates to window blind assemblies or more specifically to one that has slats that can be illuminated. Some of the present day window blind assemblies are shown in the patents that will be discussed below.

The Hiraki U.S. Pat. No. 5,040,585 discloses a solar cell panel assembly for driving a motor-driven blind. The solar cell panel assembly is mounted between an outer glass plate and an inner glass plate and the glass plates are spaced from each other. A solar cell panel is disposed at the lowest portion on the inside of the outer glass plate and is mounted at an inclination angle so that its lower edge portion is positioned on a gasket and its upper edge portion extends toward the inner glass plate The Gillard U.S. Pat. No. 5,221,363 is directed to a solar cell window fitting. An array of solar cells for supplying electrical energy to a building (e.g., for operating air-conditioning equipment) is mounted in a window fitting, which comprises a pair of transparent glass panes between which a window blind (e.g., of the Venetian blind type) is mounted. Solar cells are secured to slats of the window blind so as to be exposed to sunlight incident thereon The Popat U.S. Pat. No. 5,598,000 is directed to a system for the automatic operation of window blinds which are responsive to the presence of artificial illumination. In a preferred embodiment, the automatic window covering system consists of a conventional optical flicker detector, a conventional control apparatus and a conventional window covering.

The Popat U.S. Pat. No. 5,663,621 is directed to a system for the automatic regulation of daylight admitted into a room and is specifically intended for daylighting applications The Popat U.S. Pat. No. 5,760,558 teaches a venetian blind window covering that provides solar powered illumination, note FIGS. 8D through 8I.

The Digert U.S. Pat. No. 6,239,910 teaches using blinds to direct light into the interior of a room.

The Kleinwachter US patent application publication no.: US 2001/0054252 teaches a blinds system that converts impinging light into energy that is used as diffuse light to illuminate the inside of an interior space.

The Muller US patent application publication no.: US 2002/0033190 teaches having blinds and awnings with solar cells for producing energy. The awning has an electrolyzer and fuel cells, or a reformer and fuel cells, for additional storage of the surplus energy produced by the solar modules.

The Japanese patent 2002299666A is directed to a thin-film solar cell module that has a see-through structure like blinds.

The Emde US patent application publication no.: US 2005/0105303 teaches a window element that is self-luminous and that illuminates the interior of a room. The inventor does not use blinds.

The Vasquez US patent application publication no.: US 2005/0183833 is directed to an automated shutter control for a shutter having a plurality of slats which are pivoted in unison; the automated shutter control comprises a motor, a slat interface having a body portion and a connector portion.

It is also an object of the invention to provide a novel window blind having horizontal slats that can be illuminated.

It is an object of the invention to provide a novel window blind having vertical slats that can be illuminated.

It is another object of the invention to provide a novel window blind having an elongated bundle of light transmitting fibers attached to one of the surfaces of the slats.

It is an additional object of the invention to provide a novel window blind having an LED positioned adjacent at least one end of the slats to provide illumination for the slats.

It is also an object of the invention to provide a novel window blind having photovoltatic cells on the slats for charging batteries that power lights used to illuminate the slats.

It is another object of the invention to provide a novel window blind having structure for illuminating a room.

SUMMARY OF THE INVENTION

The illuminated window blind assembly has been designed to provide illumination to the interior of a room. It would be mounted in the window opening of a window frame. If this window opening previously had a mini-blind mounted therein, the illuminated window blind assembly could be supported on the previously installed support brackets utilized by the mini-blind. There are two basic embodiments of the illuminated window blind assembly, one has the slats oriented horizontally and the other has the slats oriented vertically.

The slats have a top surface and a bottom surface. The top surface would be the surface that would be exposed to the outside sunshine. The bottom surface would be the surface that would be exposed to the interior living area. The slats could be formed from any of many different materials such as wood, metal or plastic. The preferred embodiment would use extruded plastic slats. The top surface of the slats would have a longitudinally extending recess for receiving elongated strips of photovoltaic solar cells. If desired, the strips of photovoltaic cells could be mounted on the top surface of the slats without forming the elongated recesses. The bottom surface of the slats would preferably have an elongated recess therein for receiving the elongated bundles of light transmitting fibers. Alternatively these bottom recesses could also be eliminated.

Mounted adjacent one or both of the ends of the bundles of light transmitting fibers would be an LED. These LED's would normally be powered by rechargeable batteries that would have been charged by DC current produced by the photovoltaic solar cells. Alternatively, these LED's could be powered by AC current provided from an external source. Other types of light sources besides LED's would be a liquid crystal display that would be mounted on the bottom surface of the slats, an ELP, a florescent lamp or other light sources that would produce sufficient light to illuminate the interior of a room. The type of LED used could be one that produces only white light or a RBG LED could be used that could produce over 65,000 different colors. The light produced by the illuminated window blind assemblies would easily be bright enough to read or do work by. As an example, an illuminated window blind assembly that has been charged for approximately 8-10 hours can provide approximately 9 hours of radiant light.

One of the unique benefits of the illuminated window blind assembly is that it can be moved from one location to another as long as the window size is the same. Also it is so simple to install that almost anyone can install it on their own. Presently strips of photovoltaic solar cells can now be obtained that are either black or transparent. With the transparent version, no one from inside or outside would know if there are solar cells on the slats. From a distance it would look like a normal mini-blind. Another advantage is the fact that LED's normally have a life of approximately 100,000 hours.

It is to be understood that a version of the illuminated window blind assembly could be made without strips of photovoltaic cells and that the slats could be illuminated from external AC current. In this version, any structure of the slats that allows the bottom surface of the slats to be illuminated could function to illuminate the interior of a room.

DESCRIPTION OF THE DRAWINGS

FIG. 2 is an enlarged view taken within the circle 2 in FIG. 1;

FIG. 3 is a schematic partial end view illustrating the manner in which the slats are supported vertically spaced from each other;

FIG. 4 is an enlarged partial perspective view illustrating the manner in which the ends of the top housing are supported in conventional window blind support brackets;

DESCRIPTION OF THE PREFERRED EMBODIMENT

Figure 1:
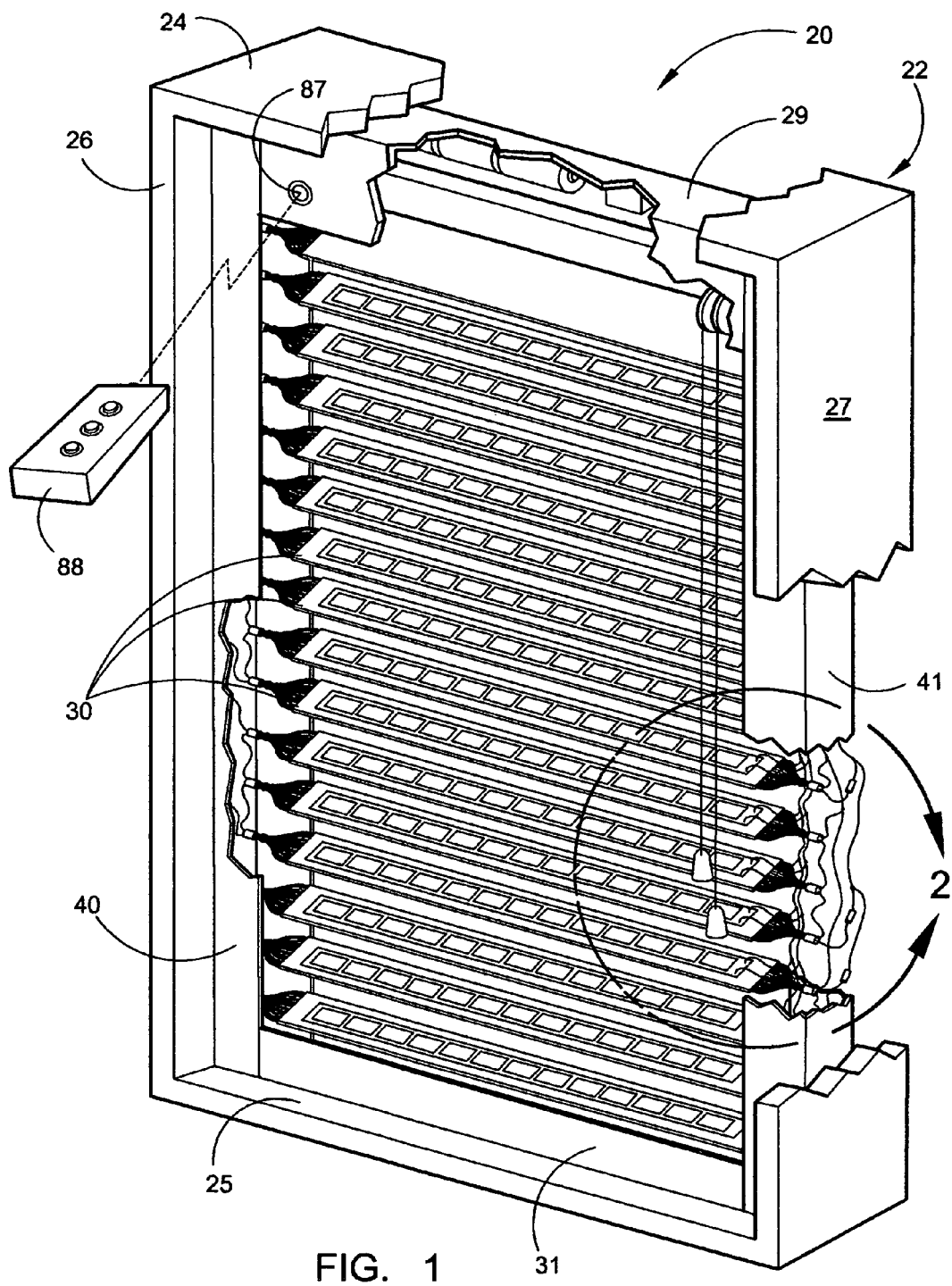
FIG. 1 is a front elevation view of the novel illuminated window blind assembly.

The illuminated window blind assembly will now be described by referring to FIGS. 1-11 of the drawings. The window blind assembly is generally designated numeral 20. It would be installed in a window frame 22 having a window opening. Window frame 22 has a top wall 24, a bottom wall 25, a left side wall 26 and a right side wall 27.

Window blind assembly 20 has top housing 29, a plurality of vertically spaced slats 30 and a bottom housing 31. Threadlike members 33 are strung between the vertically spaced slats 30. The slats are vertically spaced from each other by a distance H1. Referring to FIG. 3, it is noted that the top end of the threadlike members are connected to the top housing 29 in some manner. Also the threadlike members 33 pass over the top surface of slats 30 and also pass under the bottom surface of slats 30.

FIG. 4 schematically illustrates an enlarged right side support bracket 38 whose structure is the same as conventional existing brackets for window blind assemblies. Right side support bracket 38 would be secured to either the bottom surface of top wall 24 or the inner surface of right side wall 27. The right end of top housing 29 would be inserted into right side support bracket 38. There would be an identical support bracket 38 that would support the left end of top housing 29 adjacent left side wall 26 and beneath top wall 24. By designing the ends of top housing 29 to have substantially the same configuration as existing window blind assemblies, it is possible to merely remove the existing window blind assembly and insert the inventor's novel illuminated window blind assembly 20. A left side U-shaped trim strip 40 and a right side U-shaped trim strip 41 can be used to hide the respective left and right ends of the slats 30.

Figure 7:
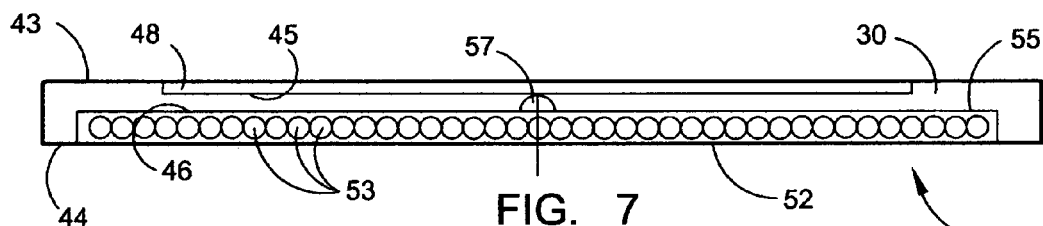
FIG. 7 is a schematic transverse cross sectional view of one of the slats.
Figure 8:
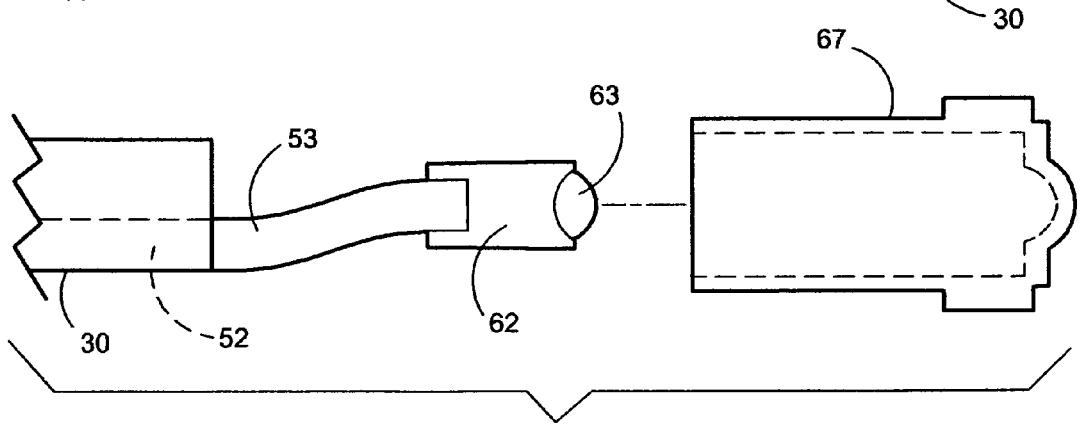
FIG. 8 is an exploded schematic side elevation view showing how an end cap can be inserted over the ends of the slats.

FIGS. 2 and 7 should be referred to for an understanding of the structure of the slats 30. In the preferred embodiment, the slats would be extruded plastic members having a top surface 43 and bottom surface 44. It is to be understood that the slats could also be made of other materials and function equally well. Top surface 43 has a recess 45 and bottom surface 44 has a recess 46.

A photovoltaic strip 48 is installed in recess 45 and it has wires 49 and 50 at its ends that are connected to structure that will be described later. An elongated bundle 52 of light transmitting fibers 53 are positioned in recess 46. A translucent sleeve 55 surrounds the fibers 53 and diffuses the light emanating from them. A channel or groove 57 extends along the length of recess 46 and its purpose is to provide a conduit for an electrical wire.

Figure 5:
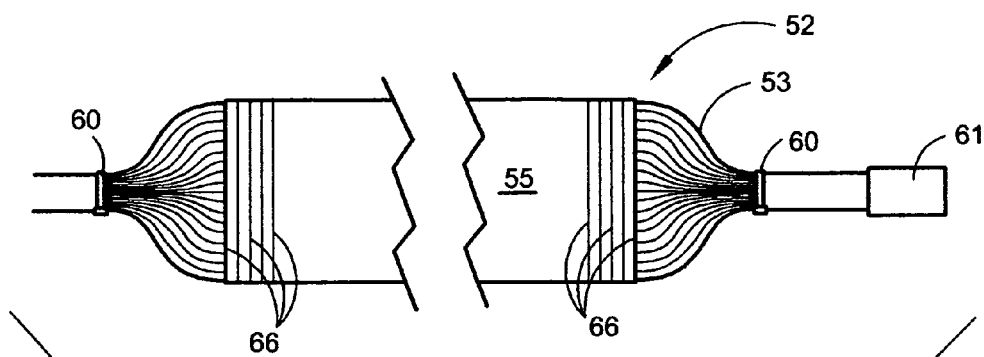
FIG. 5 is an enlarged schematic top plan view of one of the elongated bundles of light transmitting fibers that is attached to one of the surfaces of the slats.
Figure 6:
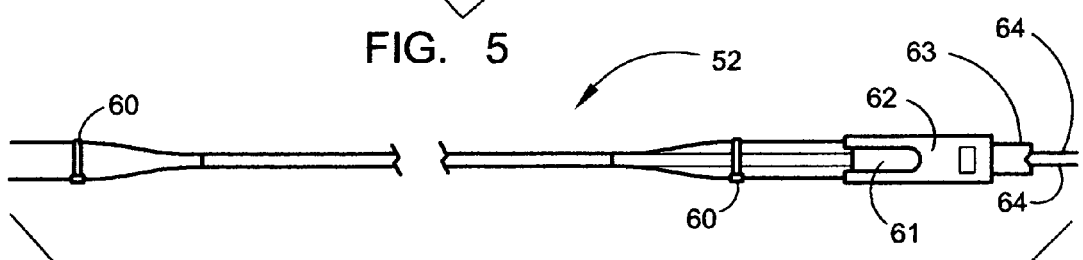
FIG. 6 is a schematic side elevation view of the bundle of light transmitting fibers illustrated in FIG. 5.

A better understanding of the bundles 52 of fiberoptic fibers 53 will be had by referring to FIGS. 5 and 6. The ends of the fibers 53 are clamped together by plastic ties 60 to form them into a cylindrical configuration to fit into a ferrule 61. An LED holder 62 slides over ferrule 61. An LED 63 is captured in the rear end of LED holder 62 and it has a pair of wires 64 extending from the LED. Transverse thread members 66 are woven through the fibers 53. The top surface of the bundles 52 would be the light emitting side. The ends of the fibers 53 are positioned adjacent the end of the combined structure that is the LED holder 62 and LED 63. End cap 67 can be easily slid over the combined structure (see FIG. 8).

Figure 9:
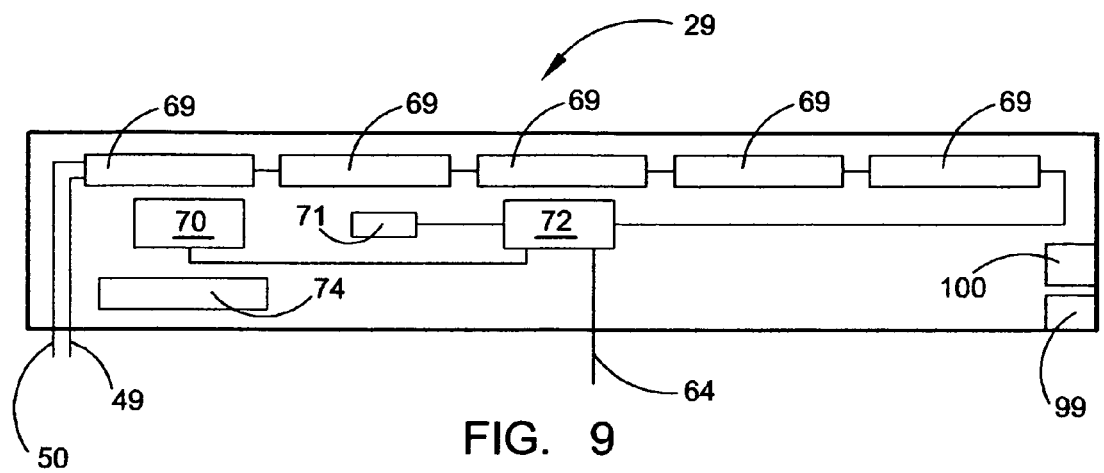
FIG. 9 is a schematic front elevation view of the top housing.

FIG. 9 is a schematic view of top housing 29 illustrating the different components contained therein. There are a plurality of rechargeable batteries 69 that receive DC current from the photovoltaic cells 48 through wires 49 and 50. Number 70 identifies the PWM/Dimmer Control. The infrared or radio frequency remote sensor 71 for remote servo/color control is also in top housing 29. Number 74 identifies the mini-blind tilt/raise/lower pulley system & electric servos housed in the lower half of top housing 29. Printed circuit board 72 has wires 64 extending therefrom to the LED's 63.

Figure 10:
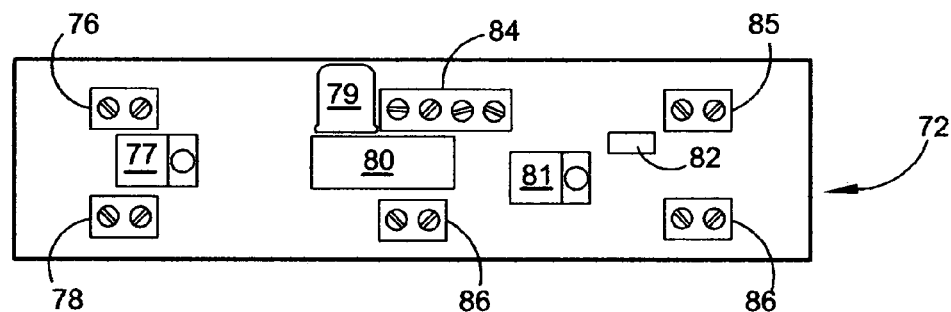
FIG. 10 is a schematic top plan view of the printed circuit board.

The printed circuit board 72 is schematically illustrated in FIG. 10. Mounted on circuit board 72 are battery connection terminals 76, voltage regulator 77, motor power output connection terminal 78, quartz crystal 79 and micro controller (CPU) 80. An infrared 20 watt power MOSFET 81 is mounted thereon and it drives the LED's. A diode 82 prevents battery discharge through the solar cells. The infrared module connection terminal 84 and solar connection terminal 85 are also mounted on printed circuit board 72. Screw-down terminals 86 provide the LED's with parallel output. The IR receiver 87 is mounted in the front wall of top housing 29. A remote control 88 has three buttons and they provide the following functions: 1) on/off; 2) dimming/brightening; and 3) opening and closing the slats.

Figure 11:
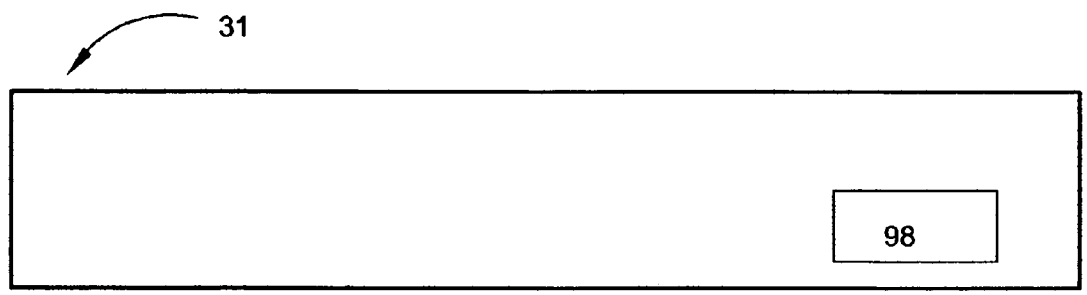
FIG. 11 is a schematic front elevation view of the bottom housing.

FIG. 11 is a schematic front elevation view of bottom housing 31. It could have a watt usage availability LCD display in its front wall 98. A receptacle 99 may be installed in either the left or right end of the top housing 29 for optional power output to external sources or networked to an energy reservoir station. An electrical receptacle 100 could also be positioned in either of the ends of top housing 29 to receive AC current from an external source.

Figure 12:
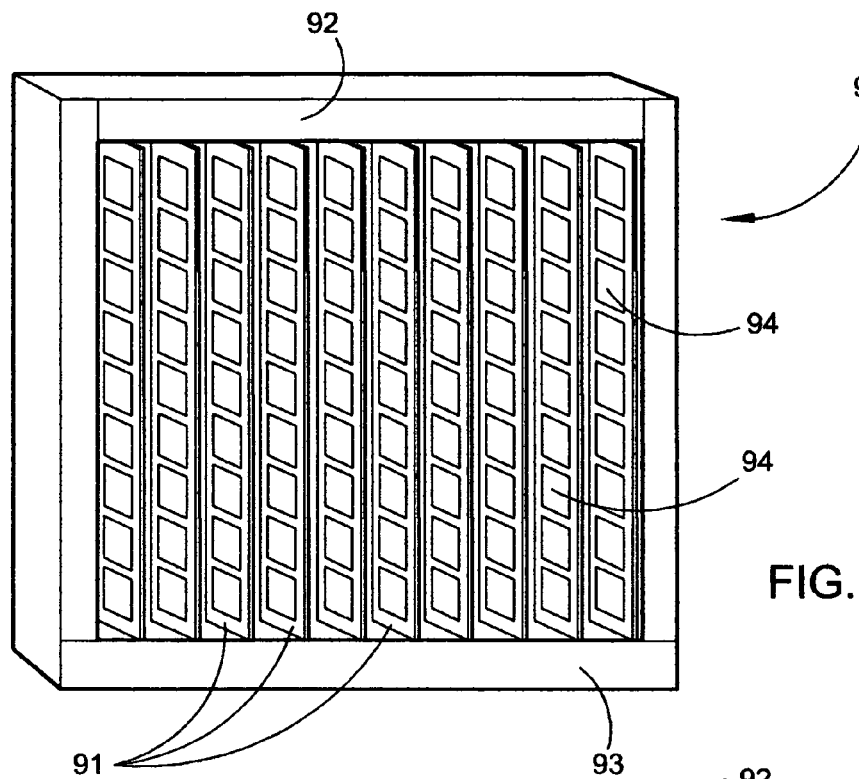
FIG. 12 is a schematic front elevation view of an alternative embodiment of the illuminated window blind assembly having vertically oriented slats.
Figure 13:
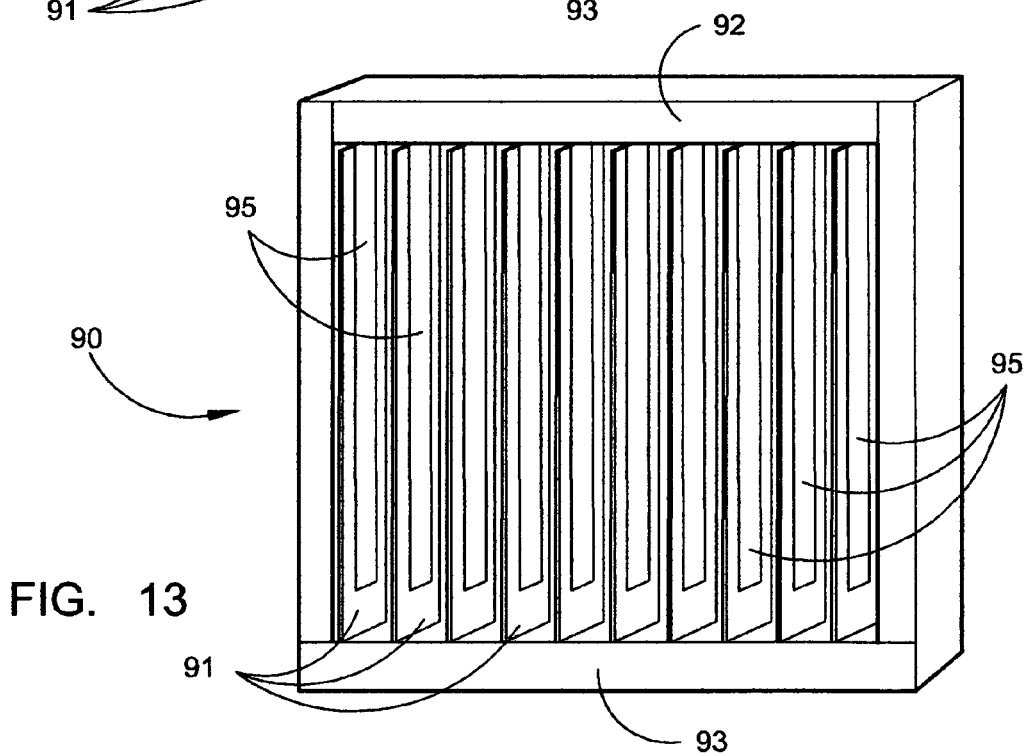
FIG. 13 is a schematic rear elevation view of the illuminated window blind assembly illustrated in FIG. 12.

An alternative embodiment illuminated window blind assembly 90 is illustrated in FIGS. 12 and 13. In this embodiment the slats 91 are oriented vertically. Top housing 92 would contain the same components as found in top housing 29 of the first embodiment. Bottom housing 93 could be optional. FIG. 12 shows the front of the window blind assembly and it would have strips of solar cells 94 located on the front surface of the slats 91. Bundles 95 of light transmitting fibers 53 would be attached to the rear surface of the respective slats 91. This embodiment would have all the components necessary to function essentially in the same manner as described in the first embodiment. The strips of solar cells 94 could be mounted in elongated recesses in the front of slats 91. There could be elongated recesses in the back surface of the slats 91 for the bundles 95 of light transmitting fibers 53. The LED's or other light sources would normally be positioned adjacent the top ends of the slats.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and the number and configuration of various components described above may be altered, all without departing from the spirit or scope of the invention as defined in the appended Claims.

I claim:

1. An illuminated window blind assembly comprising:
   a plurality of elongated slats each having a first end and a second end;
   said slats having a first surface and a second surface;
   said elongate slats being vertically spaced from each other a predetermined height;
   a separator for spacing said elongated slats a predetermined distance from each other and for supporting said elongated slats to form an assembled window blind wherein said separator for spacing and supporting said elongated slats are threadlike members connected between said regularly spaced elongated slats;
   a plurality of elongated bundles of light transmitting fibers each having a first left end and a second right end;
   at least one of said elongated bundles of light transmitting fibers being attached to at least most of said elongated slats;
   and light means for directing light longitudinally through at least most of said elongated bundles of light transmitting fibers wherein said light means are a plurality of LED's and at least one of said LED's is positioned adjacent at least one end of each of said elongated bundles of light transmitting fibers;
   and further wherein said bundles of light transmitting fibers are covered by a sheath of light transmitting material that diffuses the light emanating from the outer surface of said light transmitting fibers and enhances the intensity of the light emanating from said bundles of light transmitting fibers.

2. An illuminated window blind assembly as recited in claim 1 wherein said light means are a plurality of LED's and each of said LED's is positioned adjacent each of said ends of each of said elongated bundles of light transmitting fibers.

3. An illuminated window blind assembly as recited in claim 1 further comprising an AC source of electrical current connected to said LED's.

4. An illuminated window blind assembly as recited in claim 1 further comprising a DC source of electrical current connected to said LED's.

5. An illuminated window blind assembly as recited in claim 1 further comprising:
   a primary housing containing at least one rechargeable battery wherein said primary housing is located at the top of said window blind assembly;
   a plurality of photovoltaic solar cells electrically connected to said rechargeable batteries;
   and further wherein said photovoltaic solar cells are incorporated into strips of flexible thin film.

6. An illuminated window blind assembly as recited in claim 5 wherein said strips of flexible thin film are mounted on said top surfaces of said elongated slats and said elongated bundles of light transmitting fibers are supported on said bottom surface of said slats.

7. An illuminated window blind assembly as recited in claim 6 wherein said slats are elongated plastic strips having a top surface and a bottom surface.

8. An illuminated window blind assembly as recited in claim 7 further comprising an elongated first recess in said top surface for matingly receiving said strips of photovoltaic solar cells.

9. An illuminated window blind assembly as recited in claim 7 further comprising an elongated second recess in said bottom surface for matingly receiving said elongated bundles of light transmitting fibers.

10. An illuminated window blind assembly as recited in claim 9 further comprising an elongated groove in said second recess for receiving an electrical circuit wire.

11. An illuminated window blind assembly as recited in claim 5 further comprising a slat position and orientation adjustment mechanism housed in said primary housing.

12. An illuminated window blind assembly as recited in claim 11 further comprising LED PWM/Dimmer control means mounted in said primary housing.

13. An illuminated window blind assembly as recited in claim 12 further comprising infrared remote sensor means in said primary housing for remotely controlling said slat position and orientation adjustment mechanism and said LED PWM/Dimmer Control.

14. An illuminated window blind assembly as recited in claim 5 further comprising a secondary housing that is located at the bottom end of said window blind assembly.

15. An illuminated window blind assembly as recited in claim 4 wherein said LED's have means for producing different colors.

16. An illuminated window blind assembly, according to claim 1, wherein said slats having a first surface and a second surface include
   means for tilting said slats, for raising said slats and for lowering said slats; and light producing means on said second surface of said slats for illuminating the interior of a room.

17. An illuminated window blind assembly, according to claim 1, wherein said slats having a first surface and a second surface include
   means for opening and closing said slats; and
   light producing means on said second surface of said slats for illuminating the interior of a room.

* * * * *